Feb. 10, 1931.    I. BLOOM ET AL    1,792,354
NONSKID DEVICE
Filed May 31, 1929    2 Sheets-Sheet 1
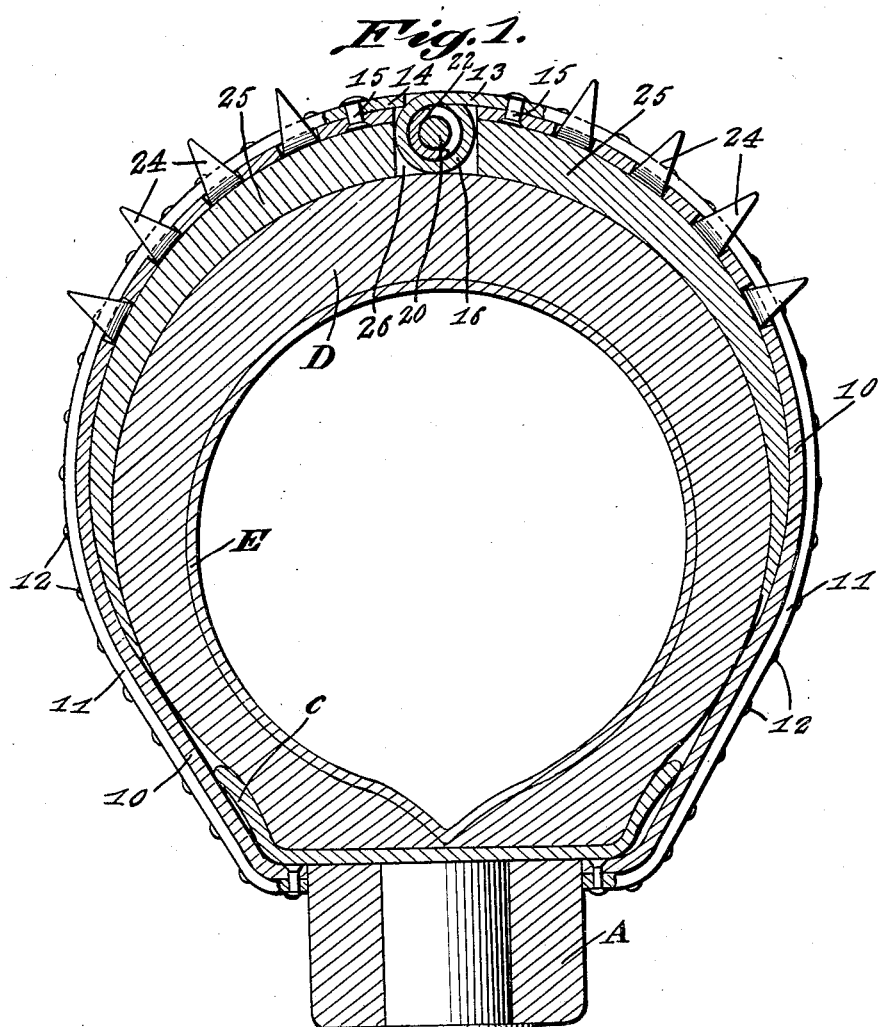
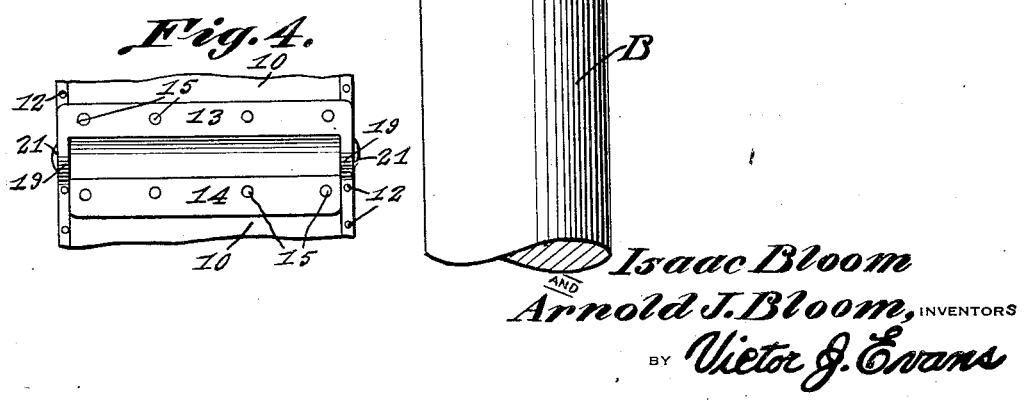
Isaac Bloom
Arnold J. Bloom, INVENTORS
BY Victor J. Evans Feb. 10, 1931. I. BLOOM ET AL 1,792,354
NONSKID DEVICE
Filed May 31, 1929 2 Sheets-Sheet 2
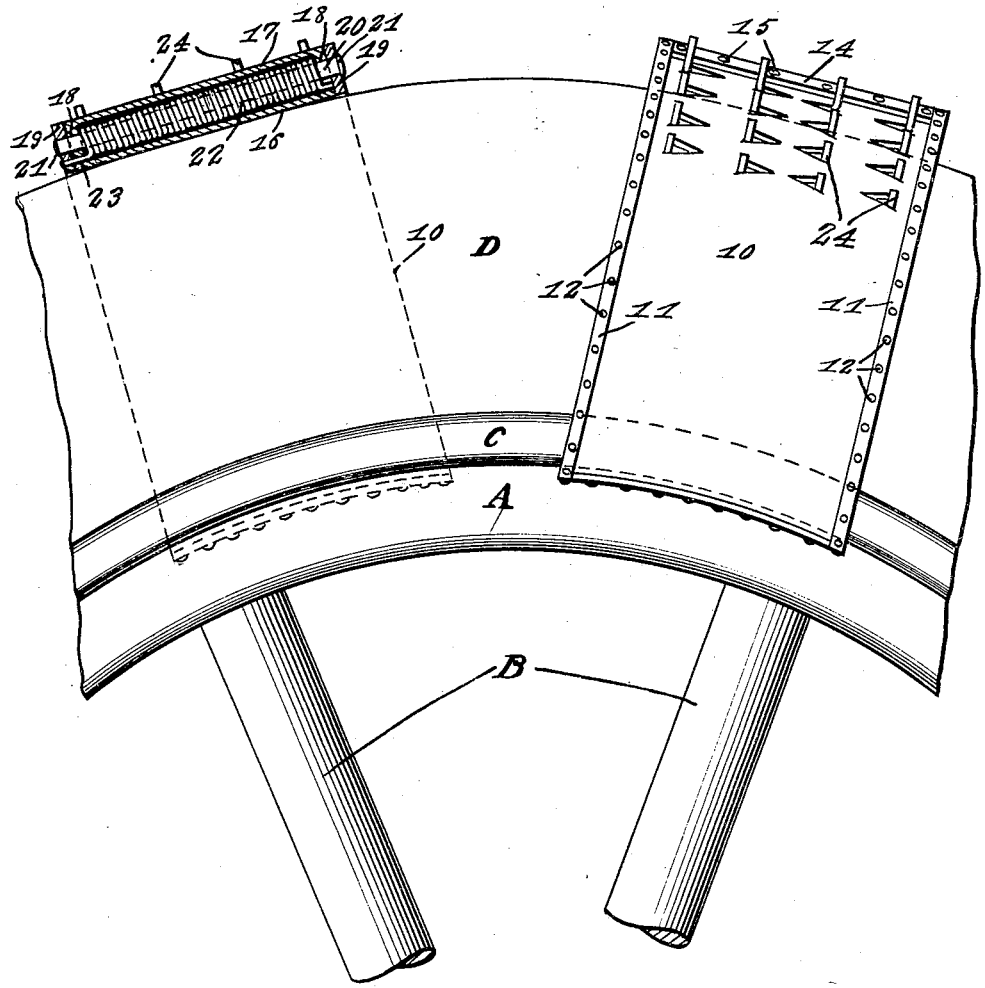
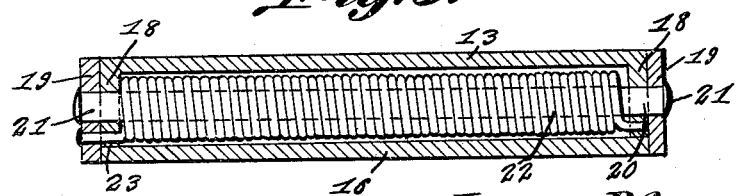
Isaac Bloom
Arnold J. Bloom, INVENTORS
BY Victor J. Evans
ATTORNEY Patented Feb. 10, 1931

1,792,354

UNITED STATES PATENT OFFICE

ISAAC BLOOM AND ARNOLD J. BLOOM, OF ROCHESTER, NEW YORK

NONSKID DEVICE

Application filed May 31, 1929. Serial No. 367,468.

This invention relates to attachments for vehicle wheels and has for its object the provision of a novel device adapted to be clamped upon the tire of an automobile or truck for the purpose of preventing the same from skidding on wet, icy or otherwise slippery pavements and for insuring traction even under the most adverse conditions.

An important object of the invention is to provide a non-skid device, any desired number of which may be applied to a wheel or tire, and which will remain in place without the employment of any securing means other than that embodied in the device itself.

Another object is to provide a non-skid device of this character which may be applied to a wheel and its tire without necessitating jacking up the wheel or other troublesome and annoying operations such as is required in connection with some types of non-skid devices.

Another object of the invention is to provide a device of this character which is of such construction that it cannot cause any injury to the tire upon which it is used.

A more specific object is to provide a device of this character constructed itself in the nature of a spring clamp and adapted to engage against the edges and inner periphery of the wheel rim so that it cannot become displaced accidently, the provision of this particular means obviating any necessity for the employment of auxiliary securing means.

An additional object is to provide a device of this character which will be simple and inexpensive to manufacture, easy to apply or remove, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which:—

Figure 1 is a cross sectional view through a tire and rim showing the device applied thereto, the device itself being also in section.

Figure 2 is a fragmentary side elevation of a rim and tire showing a pair of the devices applied thereto, one of the devices being in side elevation and the other in section.

Figure 3 is a detail cross sectional view through the hinged connection of the two members.

Figure 4 is a plan view at the hinge.

Referring more particularly to the drawings, we have illustrated a portion of a vehicle wheel including the usual felly A to which are secured the outer ends of the spokes B and which carries a tire rim C on which is a pneumatic tire D having an inner tube E therein. However, it should be distinctly understood that the non-skid device forming the subject matter of our invention is not limited to use on pneumatic tires as it is quite obvious that it could be employed to equal advantage upon solid tires or cushion tires such as are provided on trucks and other similar vehicles.

In carrying out our invention we provide a pair of rather similar metal plates 10 which are arcuate in shape and which are preferably strengthened or reinforced at their edges by metal strips 11 though it is conceivable that this same result might be accomplished by simply bending or folding back the material of the plates. In the present instance, however, the reinforcing strips are shown and are represented as held in place by rivets 12.

For connecting the plate members 10 we provide a spring hinge structure comprising a pair of leaves 13 and 14 riveted at 15 on the plates and formed with interfitting knuckles 16 and 17 respectively and having terminal ears 18 and 19 through which passes a pintle or pivot pin 20 which has its end preferably upset as indicated at 21 to prevent accidental removal or withdrawal. Surrounding this pintle and enclosed within the hinge structure is a coil spring 22 which has one end secured to one ear 18 and which has its other end passing freely through an opening 23 in the other ear 18 and connected with the other ear 19. The opening 23 may be arcuate or simply of sufficient size to permit movement of the hinge sections. This is really a conventional spring hinge and might not need to be described in such minute detail but the description and illustration are given for the sake of clearness. The point is that the spring 22 operates to urge the free ends of the plates 10 toward each other. The free ends of the plates 10 are angularly arranged or curved, as clearly indicated in Figure 1 so as to engage against the inner periphery of the wheel rim C and against the outer edges of the felly A.

In order to provide a rough surface which will prevent skidding or spinning of the tire, the metal plates 10 are formed throughout a considerable portion of their area with a plurality of outstruck prongs or tines 24 which may be very easily formed by punching the plates 10 outwardly from the inside. In actual practice each of the prongs may be defined simply by cutting the metal of the plates 10 along two intersecting lines, the material defined between these lines being then pressed out by any suitable machinery or mechanism to obtain the desired effect.

It is of course desirable to protect the tire from injury by metal plates, and in fact some sort of pad means is necessary on account of the fact that the spring hinge structure extends inwardly, and for this reason we have shown a yieldable pad 25 which may be of leather but which is preferably of substantially the same detailed construction as the tire itself. One of these pads is attached to the inner side of the plates 10 and these members are so disposed as to provide a space 26 between them for the accommodation of the spring hinge structure as clearly illustrated in Figure 1. Clearly, these pads are interposed between the metal plates and the surface of the tire and will positively prevent any injury to the tire even though the prongs might be forced inwardly, as for example by contact with a stone or the like.

In the use of the device, it is of course to be understood that under ordinary circumstances, that is to say when it is not in use the spring hinge structure will urge the free ends of the plates toward each other so that they will as a matter of fact overlap. However, this is a very minor detail. The point is that when it is desired to apply one of the devices, it is simply necessary to grasp the opposite plate members 10 and pull them apart in opposition to the spring 22, whereupon the device may be easily engaged upon the tire by moving it toward the center of the wheel. When the plate members are subsequently released it is apparent that the spring hinge will force the free ends of the plates toward each other so that these curved or angular ends will engage against the inner periphery of the rim and against the outer side of the felly and serve the purpose of hooks which will positively prevent the device from becoming accidently detached or displaced. In actual practice it is probable that several of the devices would be used upon each of the rear wheels of the vehicle and it is also to be noted that it is not in any way necessary to jack up a wheel in order to apply any desired number of the devices. This latter mentioned feature is of great advantage especially when it is necessary to apply the devices on a muddy road or other place where conditions are trying. When use of the device is no longer desired it is a very simple matter to remove it by simply grasping the plates 10 and pulling them apart so that the device may be slipped off of the tire by moving it outwardly with respect to the center of the wheel.

From the foregoing description and a study of the drawing it will be apparent that we have thus provided a very simply constructed and easily attached device which will very efficiently operate to prevent skidding and slipping of a vehicle wheel even under very severe conditions. Attention is directed to the fact that absolutely no tools whatsoever are required for applying or removing the non-skid device and it should therefore recommend itself. Commercially, the device would necessarily have to be made up in different sizes to fit different sizes and styles of tires but this is naturally not a feature of consequence from a viewpoint of invention as we reserve the right to make all such changes in size, shape, and material, as well as in the arrangement and combination of parts and details of construction as will not depart from the spirit of the invention or the scope of the subjoined claim.

Having thus described the invention we claim:—

A non-skid attachment for a vehicle tire comprising a pair of curved plate members shaped to conform substantially to the tire and adapted to be disposed transversely thereon, each of said plate members having one edge in angular form adapted to engage against the inner periphery of the wheel rim, and a hinge device connecting the adjacent edges of said plate members, said hinge device comprising a pair of leaves one formed with lugs at its edges and the other being formed with lugs at its edges located inwardly of the first named lugs, a pintle passing through all of said lugs, and a coil spring surrounding said pintle and having one end secured to one of the second named lugs and its other end passing freely through the other of the second named lugs and secured to the adjacent one of the first named lugs.

In testimony whereof we affix our signatures.

ISAAC BLOOM.
ARNOLD J. BLOOM.